United States Patent
Cohen et al.

(10) Patent No.: US 8,369,501 B2
(45) Date of Patent: Feb. 5, 2013

(54) SYSTEM AND METHOD FOR PROVIDING CALLER INFORMATION TO A CALLED PARTY UTILIZING CALL FORWARDING

(75) Inventors: Meir S Cohen, Toms River, NJ (US); Eli Finkelman, Toms River, NJ (US)

(73) Assignee: TelTech Systems Inc., Toms River, NJ (US)

( * ) Notice: Subject to any disclaimer, the term of this patent is extended or adjusted under 35 U.S.C. 154(b) by 1150 days.

(21) Appl. No.: 12/249,985

(22) Filed: Oct. 13, 2008

(65) Prior Publication Data

US 2010/0091966 A1    Apr. 15, 2010

(51) Int. Cl.
*H04M 1/56* (2006.01)
(52) U.S. Cl. .................................. 379/142.04; 379/88.2
(58) Field of Classification Search ............... 379/88.12, 379/88.25, 142.04, 211.02, 88.2
See application file for complete search history.

(56) References Cited

U.S. PATENT DOCUMENTS

| | | | |
|---|---|---|---|
| 4,987,587 A | 1/1991 | Jolissaint | |
| 5,768,356 A * | 6/1998 | McKendry et al. | 379/242 |
| 5,796,810 A | 8/1998 | Lim et al. | |
| 5,991,369 A * | 11/1999 | Petrunka et al. | 379/88.25 |
| 6,031,896 A | 2/2000 | Gardell et al. | |
| 6,178,232 B1 * | 1/2001 | Latter et al. | 379/88.21 |
| 6,233,320 B1 * | 5/2001 | Haimi-Cohen | 379/88.27 |
| 6,233,325 B1 * | 5/2001 | Frech et al. | 379/142.06 |
| 6,404,877 B1 * | 6/2002 | Bolduc et al. | 379/218.01 |
| 6,453,023 B1 | 9/2002 | McKee | |
| 6,463,145 B1 * | 10/2002 | O'Neal et al. | 379/211.02 |
| 6,621,800 B1 * | 9/2003 | Klein | 370/282 |
| 6,680,935 B1 | 1/2004 | Kung et al. | |
| 6,690,785 B1 * | 2/2004 | Stelter et al. | 379/211.02 |
| 6,996,217 B2 * | 2/2006 | Goldman | 379/142.01 |
| 7,136,472 B2 | 11/2006 | Hill et al. | |
| 7,158,619 B2 | 1/2007 | Simpson | |
| 7,162,019 B1 | 1/2007 | Mullis et al. | |
| 7,231,031 B2 * | 6/2007 | Verbil et al. | 379/215.01 |
| 2005/0058067 A1 | 3/2005 | Chmaytelli et al. | |

OTHER PUBLICATIONS

AT&T Ohio Guidebook, http://cpr.bellsouth.com/guidebook/oh/0020-0010.pdf, "Part 20—Grandfatehred Services / Section 10—Wide Area Telecommunications Services (WATS)", 2008.
Cisco IAD2420 User Manual, http://www.cisco.com/en/US/docs/ios/12_2t/12_2t8/feature/guide/ftdidiad.pdf, "Direct Inward Dialing for Cisco IAD2420 Series Integrated Access Devices", Nov. 17, 2007.

* cited by examiner

*Primary Examiner* — Simon Sing
(74) *Attorney, Agent, or Firm* — Michael J. Feigin, Esq.; Feigin & Associates, LLC.

(57) ABSTRACT

Embodiments of the invention comprise a device, system, and method of receiving a phone call to a non-Inward WATS phone number, such as a typical non-toll free phone number, forwarding the phone call to a carrier capable of reading ANI information associated with the call, and providing ANI information to the called party. The providing of ANI information may be by way of forwarding to a toll-free number of a provider and populating caller ID data with ANI information before forwarding to the called party, or by way of forwarding the call to a provider with the ANI information, whereby the provider forwards the call and information gleaned from the ANI information to the called party.

21 Claims, 8 Drawing Sheets

SYSTEM AND METHOD FOR PROVIDING CALLER INFORMATION TO A CALLED PARTY UTILIZING CALL FORWARDING

FIELD OF THE INVENTION

This invention relates generally to the field of telecommunications. In particular, embodiments of the present invention relate to a system for providing data associated with a call to a called party by way of forwarding the call to another with access to such data.

BACKGROUND OF THE INVENTION

Automatic Number Identification (ANI) in the United States, and similar services worldwide, is a telephony service which captures the telephone number of calling parties and relays the data to the called party. A calling party is the person or entity who initiated or caused a phone call to be made on a phone system whereas a called party is the intended recipient, devices of the recipient, or a phone number associated with the recipient, of the phone call. ANI service is typically used in conjunction with "toll free" numbers which allow a calling party to call another free of charge and the called party to pay the phone charges to the phone company. As such, the called party receives, either in real-time or in an invoice at a later time, the number of the calling party so that the called party can track where it's expenses are originating from.

ANI is part of Inward Wide Area Telephone Service (WATS). Typically, a calling party dials a number having an area code beginning with 800, 888, 877, 866, 855, 844, 833, or 822 (not all are used at the time of writing) and reaches an Inward WATS subscribed (called party) who receives ANI information, such as the phone number of the calling party and the number dialed. (In the United States, DNIS or dialed number identification service is used to provide the dialed number information).

ANI, and its counterparts around the world, is functionally different than Caller ID. Caller ID information may be blocked by the calling party such that information about the calling party is not passed to the called party. This may be accomplished by not sending the Caller ID data or by sending a flag (i.e. a bit) to the service provider which instructs the service provider of the called party to keep the data private. However, since ANI is unrelated to caller ID, the caller's telephone number and line type are typically captured by ANI equipment even if caller ID blocking is activated. The destination telephone company switching office can relay the originating telephone number to ANI delivery services subscribers.

Outside of those with toll free numbers, typically, ANI service is unavailable to the end user. Thus, unless caller ID information is forwarded to the called party, the party will not receive information about the calling party, such as the calling party's phone number or name. Government regulations require phone companies to abide by the privacy criteria set by the calling party. Still further, caller ID information can be "spoofed" fairly easily. Numerous legitimate and illegitimate services exist for providing incorrect caller ID information to a called party. Thus, there is no guarantee that the information is accurate. By contract, ANI information is extremely difficult to spoof and is always passed to the called party.

The ability to block and/or spoof caller ID information, while oftentimes legitimate, is problematic such as when the caller is pranking or harassing the party he or she is calling or if the party is calling an emergency service and is disconnected before relaying important information about the emergency. Unfortunately, for non-Inward WATS subscribers (i.e. those without toll-free service), in such instances, it is difficult or impossible to determine who is calling in a timely fashion.

While methods exist for converting ANI information to Caller ID information, such as is disclosed in U.S. Pat. No. 6,996,217 to Goldman, these methods require the called party to instruct the calling party to use a toll-free number. This is often impractical and would require the called party to pay for all calls. It is undesirable for a typical home or cellular phone user, emergency service provider, or even many small and medium sized businesses, to pay for incoming calls. Caller ID, by contract, costs much less to purchase and is often an included feature with a monthly or yearly payment for a phone line.

It is desired to develop a system and method which affords the benefits of ANI and Caller ID while minimizing or negating the disadvantages of each.

SUMMARY OF THE INVENTION

It is therefore an object of the invention to provide system, method, and device to provide ANI information to a called party when the caller dials a non-Inward WATS phone number.

Embodiments of the invention generally proceed by receiving a phone call to a non-Inward WATS phone number, such as a typical non-toll free phone number, determining if the Caller ID information is insufficient, forwarding the phone call to voicemail at an Inward WATS phone number, such as a toll-free phone number, and providing ANI information to the called party.

A method of determining information associated with a calling party in, an embodiment of the invention, comprises receiving a phone call from a calling party to a non-Inward WATS phone number associated with a called party, forwarding the phone call to an Inward WATS phone number, and notifying the called party of a phone number of said calling party. The forwarding may be based on unsatisfactory calling number identification information and may be initiated by the called party and be to voicemail. The voicemail may be exhibited to the called party in real-time. The notification may be of ANI information associated with the calling party. The notification may take place via e-mail, text message, or conversion to Caller ID and the calling party and called party may be telephonically connected in a further step of the method.

A system for providing a called party with caller identification information, in embodiments of the invention, comprises receiving a call from a calling party directed towards a called party, forwarding the call to a phone number with wide area telephone service, determining the automatic number identification (ANI) information associated with the calling party, and exhibiting at least a part of the ANI information to the called party. The exhibiting may comprise exhibiting a phone number of the calling party. The forwarding may be forwarding to voicemail of the called party and the voicemail may be exhibited to the calling party in real-time. After the exhibiting, the called party and calling party may communicate telephonically.

A device for providing a called party with a phone number of a calling party comprises means for receiving a call forwarded from the called party to the device, the device being associated with a toll-free number, extracting means for reading ANI information associated with the calling party, and forwarding means for forwarding at least a part of the ANI information to the called party. The forwarding may be forwarding to voicemail of the called party or telephone of the called party.

A second device for providing a called party with a phone number of a calling party comprises receiving means for receiving a call forwarded from the called party to the device, extracting means for reading ANI information associated with the calling party, detecting means for detecting if the forwarded call is in a first or second iteration of forwarding, and sending means configured to send at least part of the ANI information and the phone call to the called party if the forwarding is in a first iteration and to voicemail if forwarding is in the second iteration. The device may comprise a device of a carrier and a device of a service provider and may comprise means for recording the phone call.

A computer readable storage medium comprising instructions executable on a computing device for carrying out functions is also claimed. The functions comprise receiving a call forwarded by a called party, the call originating from a calling party, reading ANI information associated with the calling party; and sending at least a part of the ANI information to the called party. The ANI information may be forwarded to the called party in the form of a text message or Caller ID information. The sending may further comprise sending voice data (analog or digital) received from the calling party to the called party.

DETAILED DESCRIPTION OF THE EMBODIMENTS

Embodiments of the invention generally proceed by receiving a telephone call from a calling party to a called party whereby the called party does not receive ANI information, but ANI information is associated with the call. Further, the called party may not receive or be unsatisfied with the Caller ID (identification) information. Then, either by an automated process or by control of the called party, the call is forwarded to a third party or voicemail of the first party, the third party having the ability to read the ANI information. The call may then be forwarded back to the first party and the ANI (or other hidden) information provided to the called party. In embodiments of the invention, the called party can listen to voicemail being left by the calling party in real-time and/or receive the ANI information about the calling party in the form of caller ID or via e-mail or text message to the called party.

Embodiments of the invention will become clearer in light of the following description of the figures.

Figure 1:
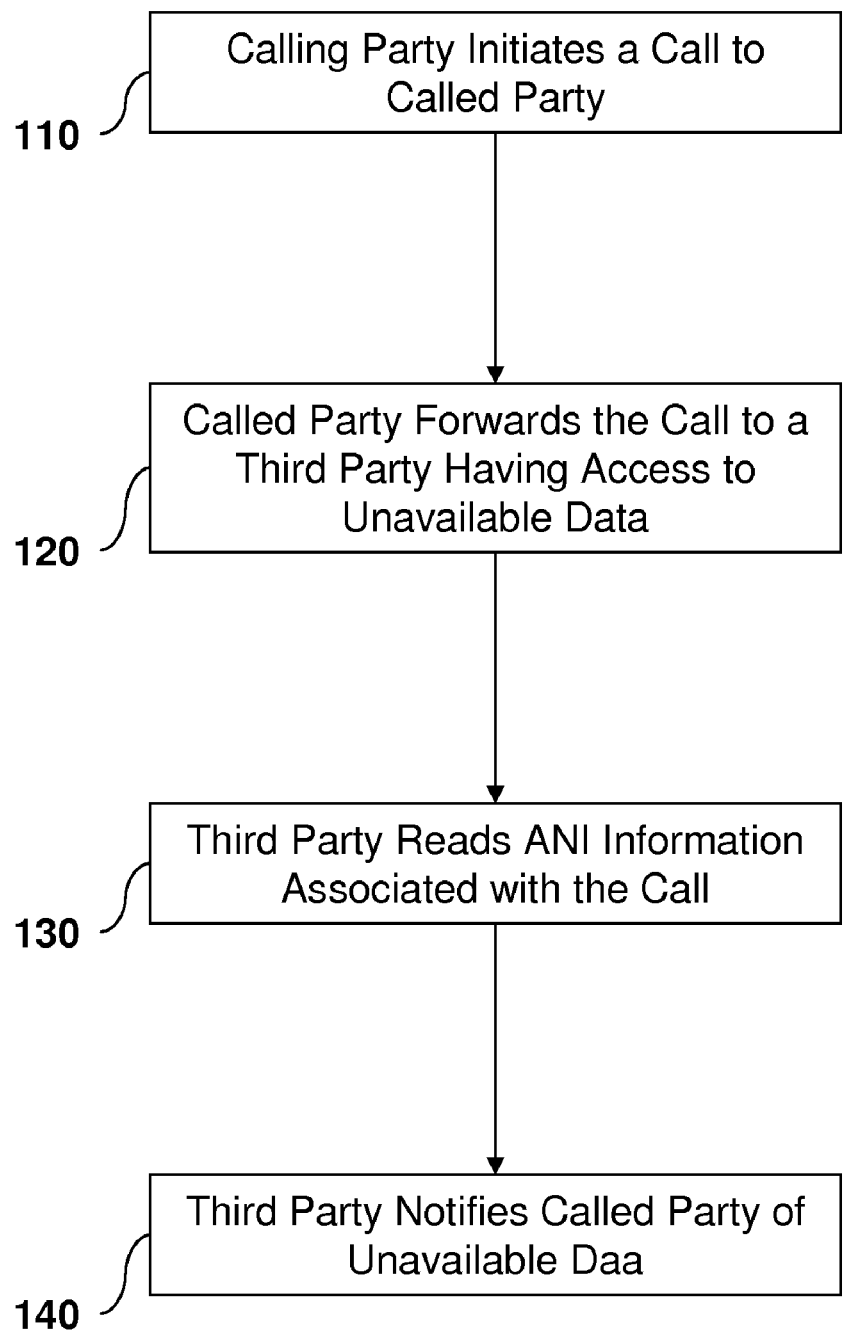
FIG. 1 shows a high level block diagram of an embodiment of the method of the invention.

FIG. 1 shows a high level block diagram of an embodiment of the method of the invention. In step 110, a calling party initiates a call to a called party. The calling party represents a user, device, or location at which a phone call is initiated and can be a voice call, a data call, or a combination thereof on a POTS (plain old telephone service) phone line, a VOIP (voice over IP) phone call, or any other phone call conducted on a phone system having capabilities for ANI and Caller ID. ANI may be any service which provides information about the calling party to another and cannot be or is not blocked during the phone call. Caller ID may be any service which provides information about the calling party to another and which may be blocked at the discretion of the calling party or a service provider of the calling party.

In step 120, the called party forwards the call to a third party having access to data unavailable to the called party, such as ANI data, CallerID data (where a privacy flag was set), or other data. The third party may be an inward WATS subscriber such as a person or computer system associated with a toll-free number. The third party may be any party who legally has access to ANI information associated with the phone call. When forwarding the phone call, both the ANI information and the dialed number identification service (DNIS) or redirected dialed number identification service (RDNIS) information, forwarding number or caller ID information of the called party is passed to the third party. The third party then reads the ANI information in step 130 and notifies the called party of the ANI information in step 140.

Steps 110 through 140 may take place in substantially real-time, meaning, within the duration of the call itself. The third party may answer the phone call and any of the parties may be humans, operators, electronic calling or answering devices, voicemail systems, and the like. The following figures describe in more detail embodiments of the invention.

Figure 2:
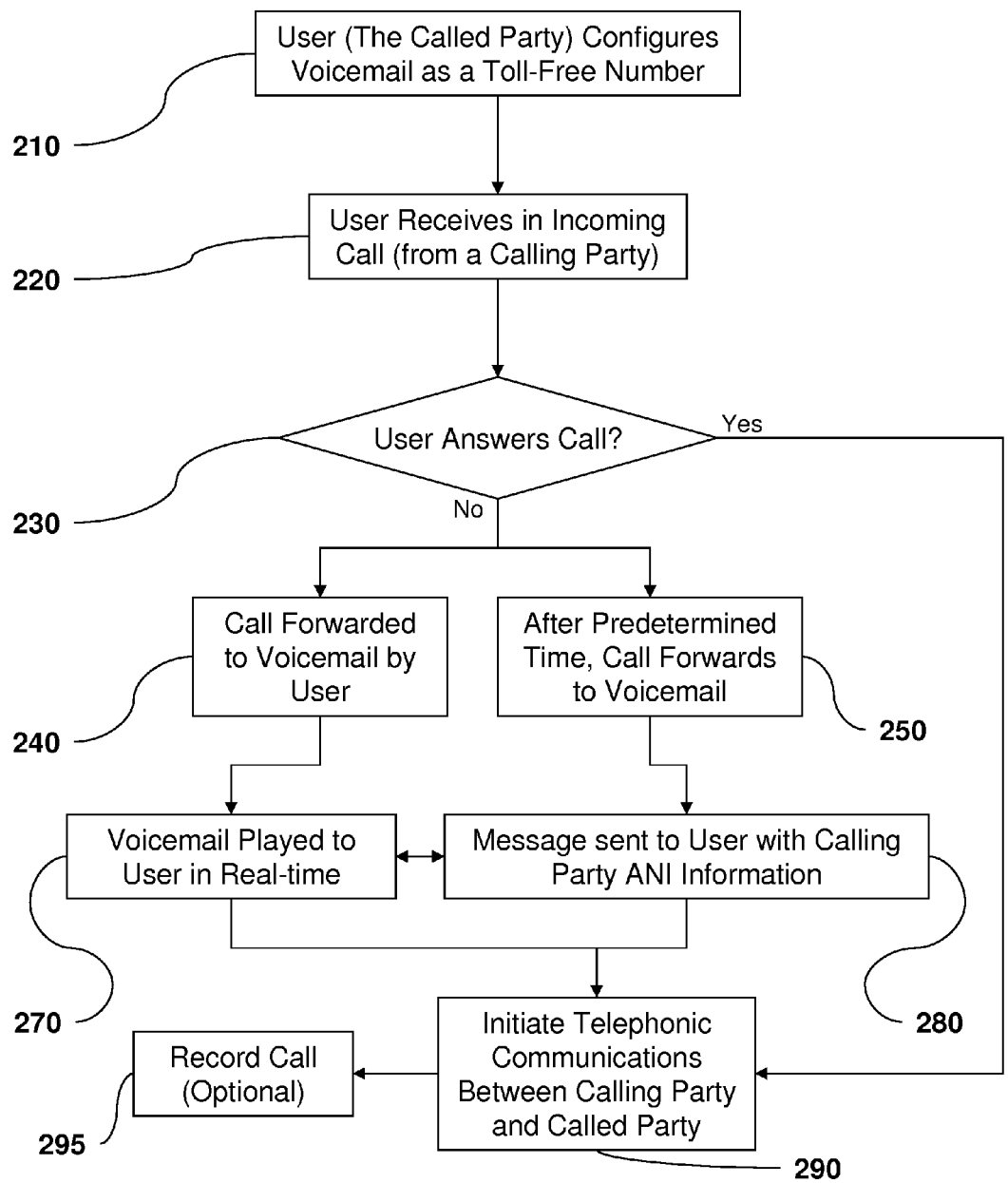
FIG. 2 shows a high level block diagram of an embodiment of the invention utilizing voicemail.

FIG. 2 shows a high level block diagram of an embodiment of the invention utilizing voicemail. In step 210, a user (who will be a called party in later steps) configures his voicemail as a toll-free number. For example, the user may purchase a voicemail box from a service provider which uses an 800, 888, 877, 866 area code number or the like. Depending on the country, different numbers are used which provide either or both toll-free and ANI service to the party owning or licensing the number. Then, in step 220, when the user receives an incoming call from a calling party, i.e. to his number with the toll-free voicemail, the user may, in step 230, decide to answer the call.

In step 230, the user may or may not answer the call based on a variety of factors. The user may be busy, on another call, does not wish to speak to a particular caller, or may not want to answer a call with blocked caller ID information or caller ID information which is the same or shows similar patterns to caller ID information of prior prank or telemarketing calls. Rather than change his or her phone line, the user can be protected by taking advantage of the systems and methods of the invention.

If the user answers the call in step 230, then the method proceeds to step 290 whereby telephonic communications between the calling party and called party are initiated. The calling party and called party are connected to each other over the telephone system.

If the user does not answer the call in step 230, then this may be because the user forwarded the call to voicemail in step 240 (such as by selecting "ignore" in a cellular phone) or because the call went unanswered after a predetermined amount of time or rings in step 250. Steps 270 and 280 are interchangeable and may proceed in any order. One or both steps may be carried out in embodiments of the invention. In step 270, the voicemail is played to the user in real-time. This may be accomplished by the user calling into his voicemail to listen to the message or the voicemail service calling the user whereby the user can listen to the voicemail over the telephone in real-time or via a separate audio or transcription device.

In step 280, a message is sent to the user (the called party) with at least a portion of the ANI information associated with the call, i.e. information about the calling party which has been extracted (read by a human or a computer) from the data associated with the call. Since the ANI information is passed to the voicemail number, the voicemail service provider or party may obtain this information and send it to the user. This may be accomplished in one of many ways and may include billing information, number of calls from this person, statistics as to the number of calls or minutes received from the area code of the calling party, and name or phone number information of the calling party.

The ANI information may be sent to the user by converting the ANI information into Caller ID information and calling the called party again, i.e. the call is forwarded from the voicemail back to the called party. Alternatively, the voicemail service provider may provide some or all of the ANI information via text message (such as SMS or simple message service), instant message, or e-mail.

Still further, the voicemail service may call the user and provide an audio greeting to the user such as, "Mr. Plony from 973-555-1212 is currently leaving a message. Press 1 to listen in." Such a message may also be displayed on a user device such as a handheld phone, digital assistant, or computer. Upon pressing 1 (or any other method of indicating a desire to listen in) or if the user stays on the line, audio from the calling party may be played to the called party. Based on either the ANI information or audio being left by the calling party, the user may decide to also communicate via audio and may indicate as such by pressing 1 again or pressing another button on his device. In this manner, in step 290, telephonic communications between the calling party and called party may be initiated. If the user (the called party) does not desire to receive the call or does not indicate to the voicemail service provider as such, then the user will not communicate telephonically with the calling party during the phone call. Optionally, in step 295, the phone call may be recorded. The recording may be into voicemail associated with the called party and may be sent via e-mail through telephone communication to the called party or another while recording or after the recording has been completed.

It should be understood that the voicemail and recording features may be provided by a carrier of the called party or a service intermediary or service provider which operates independently from the carrier. In embodiments of the invention, the voicemail of the carrier may be invoked or voicemail may be placed into the carrier-run voicemail by method known to those having ordinary skill in the art of the telephone industry, such as by redirecting the call to the carrier's PILOT number (an extension number that identifies a workgroup or distribution group) or through an API provided or other interface provided by the carrier, such as for receipt of a data file comprising a recording of the phone call. A PILOT number may be provided by the called party at a time prior to the call being forwarded to voicemail. Still further, when forwarding the call to the carrier's PILOT number or via an API provided by the carrier, the forwarding number or RDNIS in Voice over IP (internet protocol) applications is the called party's phone number so that the carrier detects the call as being forwarded from the called party. In other embodiments of the invention, a separate voicemail box and/or data storage location for storing recorded phone calls is used for voicemail and recording of phone calls. This may be used where a carrier voicemail is unavailable for use or has not been configured by the called party.

Figure 3:
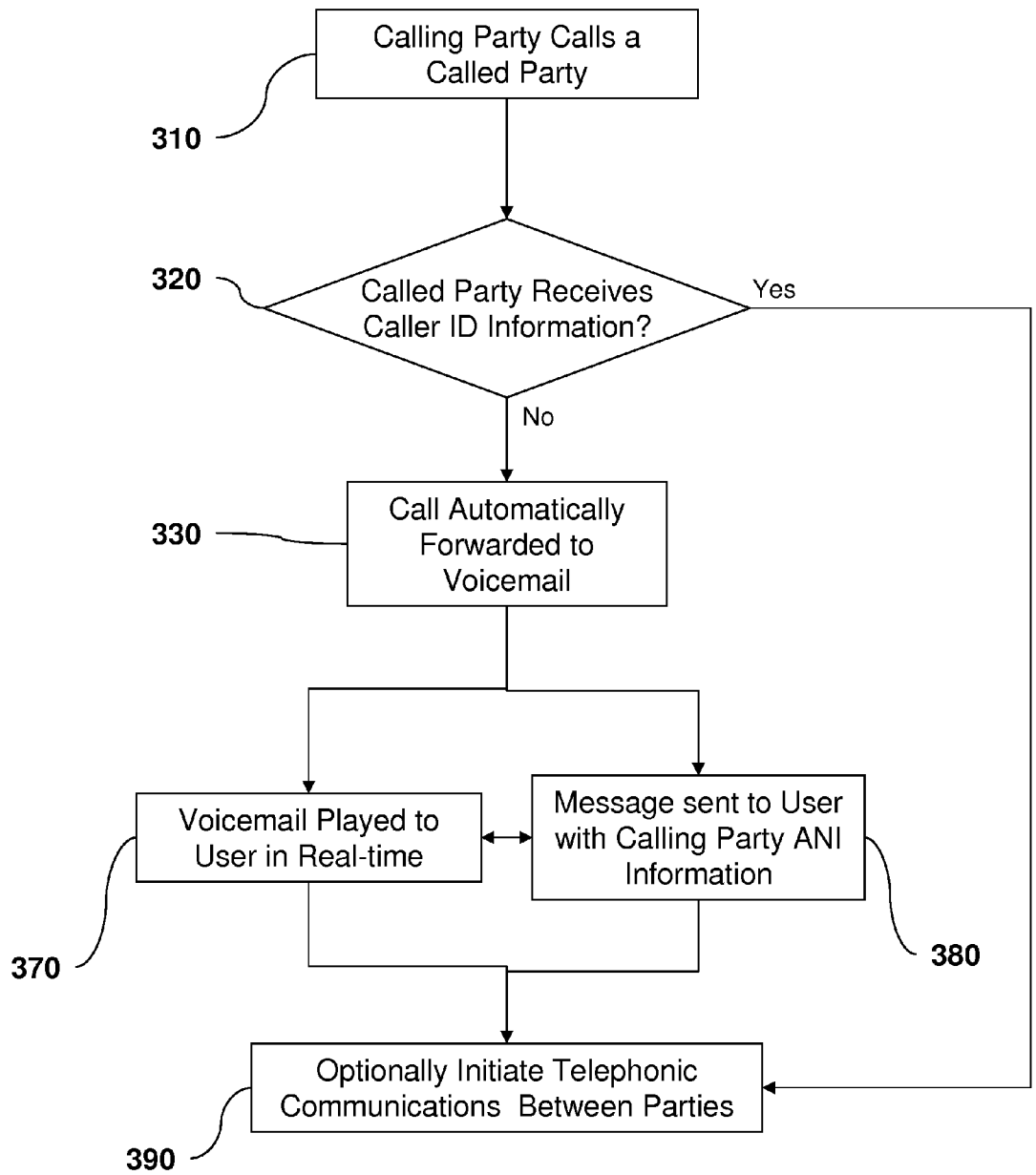
FIG. 3 shows a high level block diagram of an embodiment of the invention utilizing automated discovery of ANI information.

FIG. 3 shows a high level block diagram of an embodiment of the invention utilizing automated discovery of ANI information. In step 310, the calling party calls a called party (or intended called party). In step 320, if the called party receives caller ID information then step 390 may be carried out whereby telephonic communications between the calling party and called party may be initiated. Alternatively, the method may proceed from step 320 to steps 240 and/or 250 of FIG. 2 in embodiments of the invention if caller ID information is received but the user does not answer the call or the calling party is blacklisted. It should be understood by one skilled in the art that the failure to receive caller ID information may be as a result of the information not being sent through the phone system to the carrier of the called party or because a privacy flag has been raised which, by law, prevents the passing of caller ID information to the called party.

If caller ID information is not received, which is also defined as not being able to legally send the information to the called party, then in step 320, either the called party or a service provider to the called party may automatically forward the call to voicemail or another number which is an inward WATS subscriber. In this manner, the called party need not pay for all received calls or need to change his or her phone number. Then, steps 370 and/or 380 may be carried out. Step 370 is analogous to step 270 of FIG. 2 and step 380 is analogous to step 280 of FIG. 2 and the above description of the respective steps applies to steps 370 and 380 as well.

Figure 4:
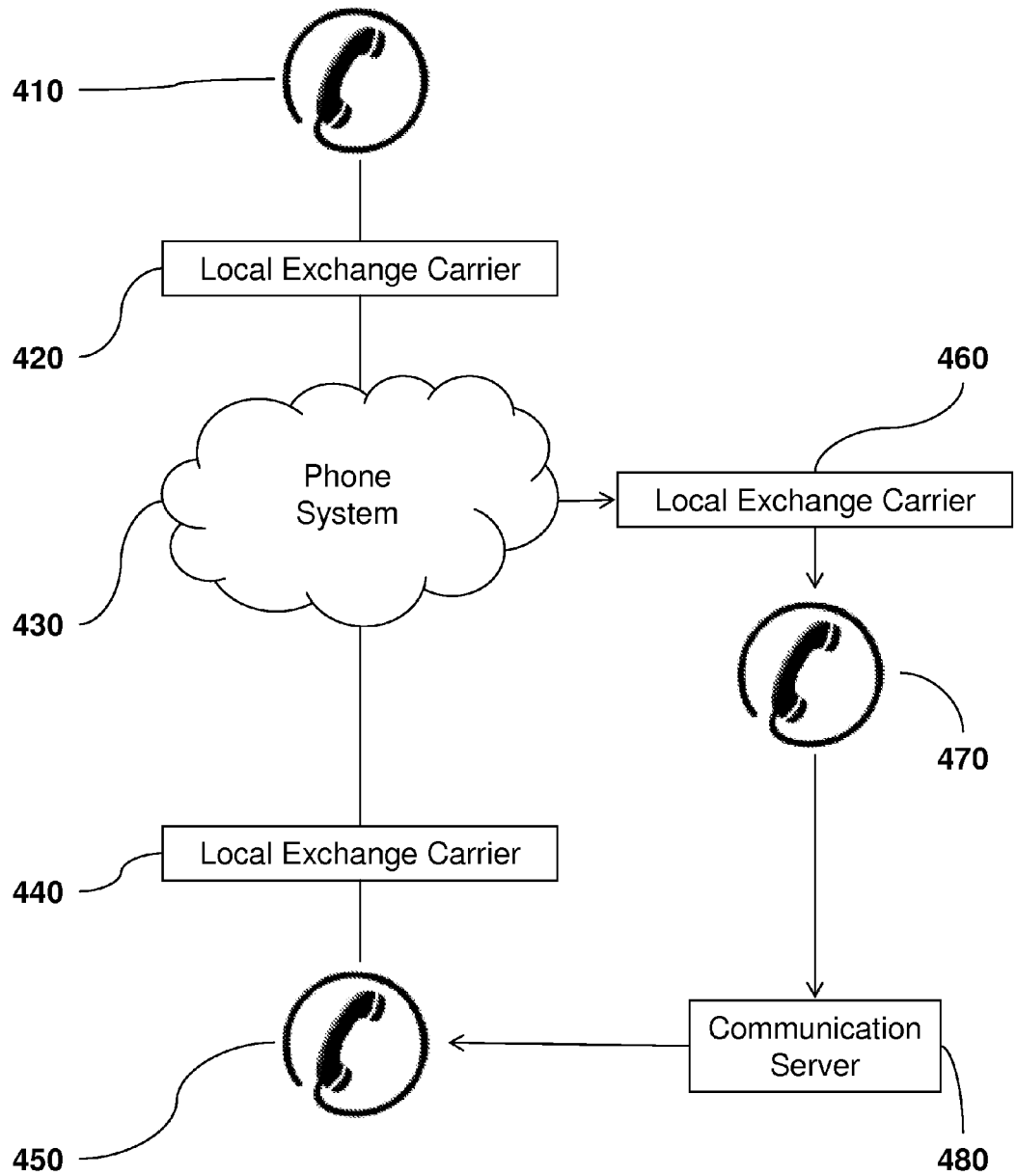
FIG. 4 shows a high level block diagram of a device on which embodiments of the invention may be carried out.

FIG. 4 shows a high level block diagram of a device on which embodiments of the invention may be carried out. Calling party 410 is connected to a local exchange carrier 420. The local exchange carriers 420, 440, and 460 may be any phone service provider such as a traditional CLEC, a Voice over IP (Internet Protocol) phone service provider, or other phone provider. Local exchange carrier 440 provides phone service to a called party 450.

The called party lacks the ability to receive ANI information or other data associated with the call such as if the called party 450 is not an inward WATS subscriber. However, the third party 470 has the ability to receive ANI information or the other data associate with the call, such as if the third party 470 is an inward WATS subscriber. The third party 470 receives phone service through a local exchange carrier 460. The collective phone system 430 comprises the switches, connections, control equipment, and devices of the phone system over which parties, such as the calling party 410, called party 450, and/or third party 470, may communicate or connect to each other via voice communications. Again, the parties 410, 450, and 470 may be humans, computer controlled devices, or a mix of a human interfacing with a computer controlled device. Still further, two or more of the parties may be connected to the same local exchange carrier or service provider, allowing for a connection without use of the broader phone system 430.

The drawing of FIG. 4 is illustrative of one high level embodiment of the invention, but one skilled in the art should understand that any voice or data communication between a calling party 410 and called party 450 whereby the called party does not have access to certain information (i.e. ANI information) but a third party 470 has access upon receipt of a call is contemplated as being within the scope and spirit of the invention. Claims drawn to the device and systems of the invention are written to include all such equivalents.

Referring again to FIG. 4, in embodiments of the invention, the calling party 410 places a call via the local exchange carrier 420 to the called party 450 via the called party's local exchange carrier 440 and the phone system 430. At any point during the attempt to initiate communications between the calling party 410 and the called party 450, the call may be redirected or forwarded to a third party 470 via local exchange carrier 460. As described with reference to FIGS. 1-3, this may be accomplished by a service provider such as the local exchange carrier 440 or by the called party 450 automatically or upon meeting certain conditions such as failing to answer the call. Other conditions may be met which may include incorrect, incomplete, blank, suspicious, or private caller ID information.

The call, in such instances described above, is then forwarded to the third party 470 such as a voicemail provider. The third party 470 is an inward WATS subscriber or otherwise has legal access to the ANI information, despite Caller ID information being blocked, incomplete, not provided, or the like as ANI is a separate and typically unblockable service.

The third party 470 may then send to the called party 450 some or all of the ANI information or voice information or data which is part of the phone call to the third party 450. This may be by way of a communication server 480 or through the phone system 430. Communication through the communication server 480 may be an SMTP server or the internet for e-mail correspondence, an instant messaging server, or voice over IP or a streaming or real-time playing of voicemail being left by the calling party. If over the phone system 430, the third party 470 may contact the third party 450 (or vice versa) via telephonic communications for purposes of letting the called party 450 listen to the voicemail, receive ANI information (in a voice or data format), and communicate with the calling party 410.

Figure 5:
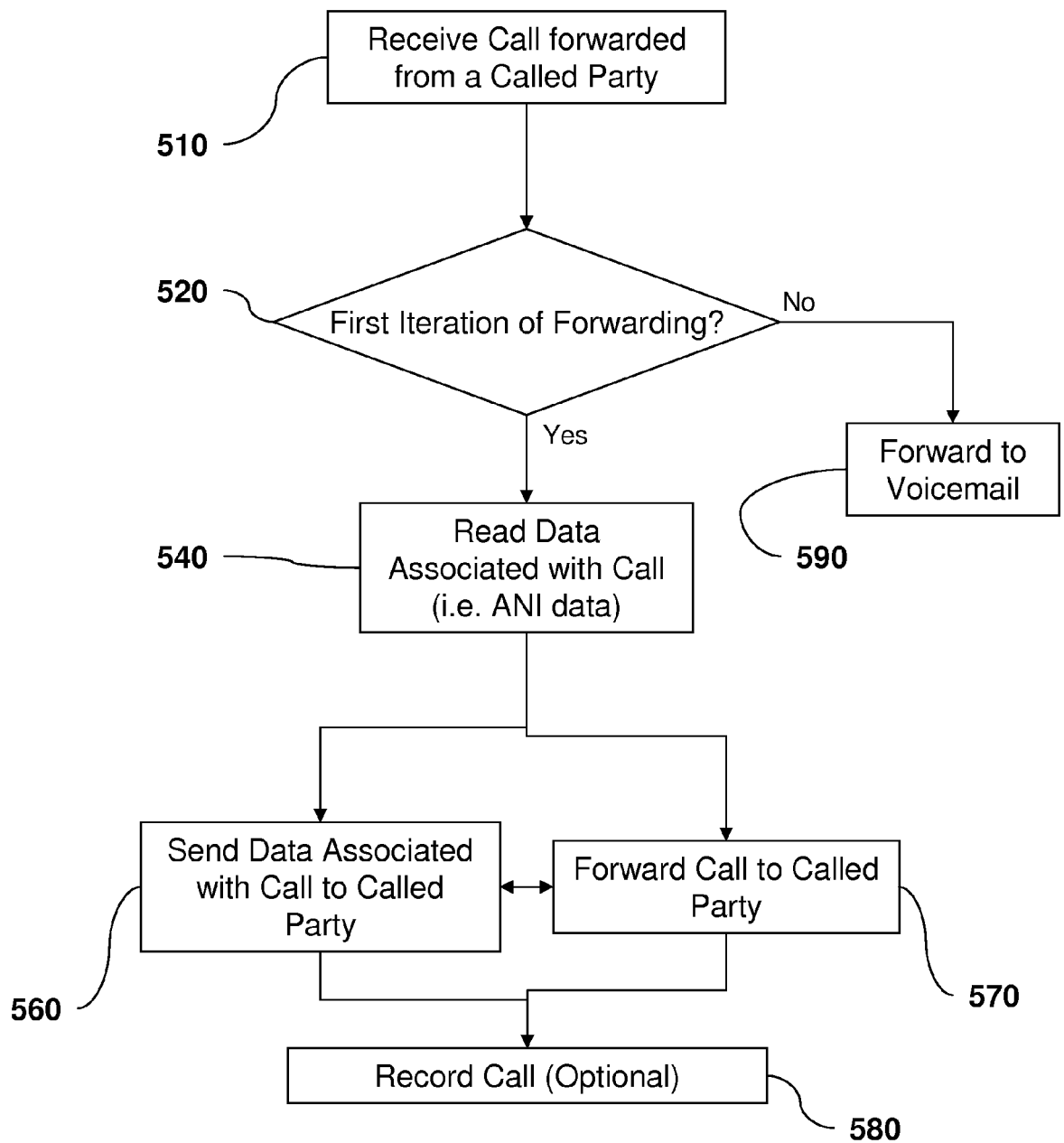
FIG. 5 shows a high level block diagram of an embodiment of the invention where the call is forwarded back to the called party.

FIG. 5 shows a high level block diagram of an embodiment of the invention where the call is forwarded back to the called party. Embodiments of the method shown in FIG. 5 may be carried out by a carrier or other phone service provider and/or be integrated into a computer readable storage medium of a device having at least partial control by or being in communication with a phone service provider. In step 510, a call is received, the call forwarded from a called party. The call may be forwarded by way of the methods described with reference to FIGS. 1-3. In step 520, it is determined whether the forwarding is the first iteration of forwarding. This may be accomplished by analyzing data associated with the call, such as the DID, ANI information, time since last forward from the called party, and/or other methods known in the art. If it is determined that the call has already been forwarded from the called party to a system or device carrying out step 520, then the call is forwarded to voicemail in step 590. A call is defined as the telephonic or similar communications from a calling party directed towards a called party and lasts throughout the routing and the electrical connection between the calling party and called party or a device which answers the call on behalf of the called party. The voicemail may be voicemail operated by a phone carrier of the called party or it may be operated by a separate entity.

If, in step 520, this is the first iteration of forwarding, then step 540 is carried out whereby data associated with the call is read, such as the ANI information, CallerID information, forwarding number or RDNIS information, and the like. Then, in step 560, the data associated with the call that was read in step 540 is sent to a called party in a manner described above with reference to FIGS. 1-3 such as via a short SMS code to the screen of the called party's cellular phone or other data method to a handheld device or computational device associated with the called party. Step 570 may be carried out concurrently with step 560 whereby the call is forwarded to the called party. Optionally, in step 580, the call may be recorded.

In the embodiments described with reference to FIG. 5, a device associated with an Inward WATS telephone number or any telephone number or device which may legally access data associated with the calling party may be used to receive a call forwarded form a called party. While such a device may be associated with a toll-free number having access to ANI information, the device may also be associated with a carrier or service provider which may legally read data associated with the calling party which is hidden from the called party upon receipt of the phone call to a device associated with the called party's phone number or other paradigm used to identify a device of a called party. Such hidden information is sent to the called party in step 560. Embodiments of the invention which do not necessarily require the use of an Inward WATS telephone number will become clearer in light of the description of the following figure.

Figure 6:
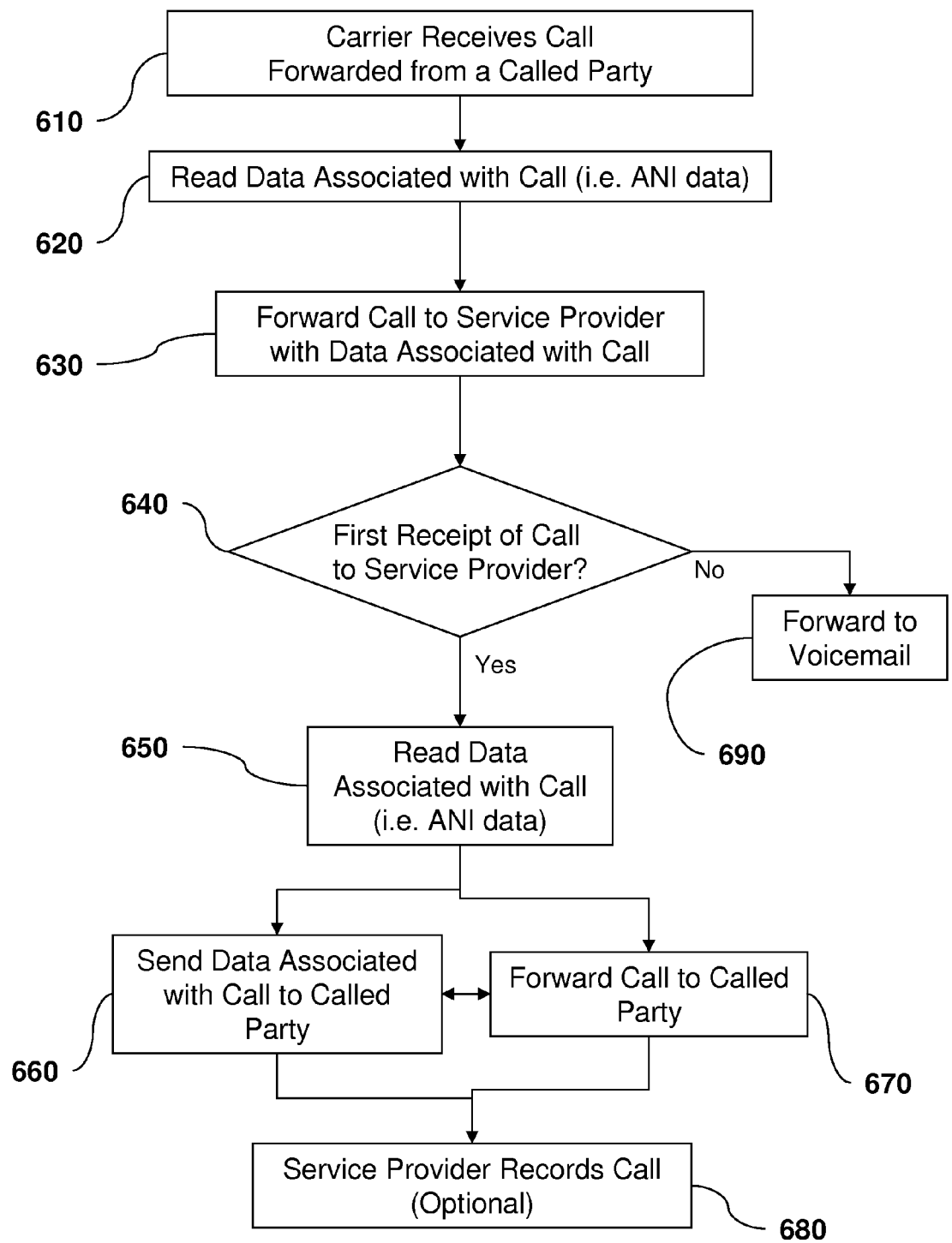
FIG. 6 shows a high level block diagram of an embodiment of the invention where the call is forwarded to a service provider.

FIG. 6 shows a high level block diagram of an embodiment of the invention where the call is forwarded to a service provider. In step 610, a call is received by a phone carrier. The phone carrier, in the case of a cellular phone, may be a company which transmits cellular calls, signals, and data through radio frequency signals to the wireless device or may be a second phone carrier such as is configured by the called party ahead of time to conditionally receive calls which are not answered by the called party. Depending on the wireless carrier, if using a cellular device or the like, this may be accomplished by entering a series of digits to configure call forwarding or conditional call forwarding service. The carrier, in embodiments of the invention, may be a carrier configured by the called party to receive forwarded calls. Thus, in embodiments of the invention, a cellular phone or other carrier provides phone service to a called party, and when the phone call is forwarded, such as by way of the methods described in this paragraph or with reference to FIGS. 2-4, the call is forwarded to a carrier other than the cellular phone carrier of the called party. Thus, in step 610, the carrier may be a second carrier. The reason for doing this is that the second carrier may provide services the carrier associated directly with the called party does not provide.

In step 620, the carrier reads data associated with the call, such as ANI information. Step 620 is substantially similar to step 540 of FIG. 5 and the description of this step is incorporated herein with regards to step 620.

In step 630, the call is forwarded to a service provider with data associated with the call. The service provider functions may be carried out by either the first or second carrier described above, or the service provider may be a separate entity which provides at least the service of taking either data associated with the call or data provided to it by the carrier (step 650) and sending the data to the called party (step 660), either directly or by forwarding the call back to the called party (step 670), as will be described below.

In step 640, the service provider (or a carrier) determines, by way of the methods described with reference to step 520 of FIG. 5, if this is the first time the call has reached the service provider. Expanding on the description of step 520, if the call has been received for the first time, it indicates that the called party may have neglected to answer the call or deliberately wants embodiments of the invention to be carried out. If this is the second time the call has been received, it is an indication that the call has already been forwarded back to the called party who is still not answering the call. In the latter case, at the second receipt of the call, the call is forwarded to voicemail in step 690. It should be understood that the call may be dispensed with in other manners as well, including playing a message to the calling party that the number has been disconnected, or the like. Such options may be configured on the basis of the calling party, ANI information, or other information associated with a phone call (i.e. all calls from a certain area code may be redirected to voicemail or in another manner as described above).

If it is determined in step 640 that this is the first iteration, then, in embodiments of the invention, in step 650 the service provider reads data associated with the call such as ANI information and the like, as has been described above. Steps 660, 670, and 680 are analogous to steps 560, 570, and 580, respectively, of FIG. 5. In step 670, when the call is forwarded to the called party, in embodiments of the invention, the forwarding is initiated by the service provider who forwards the call back to the carrier and the carrier, in turn, forwards the call back to the called party.

Figure 7:
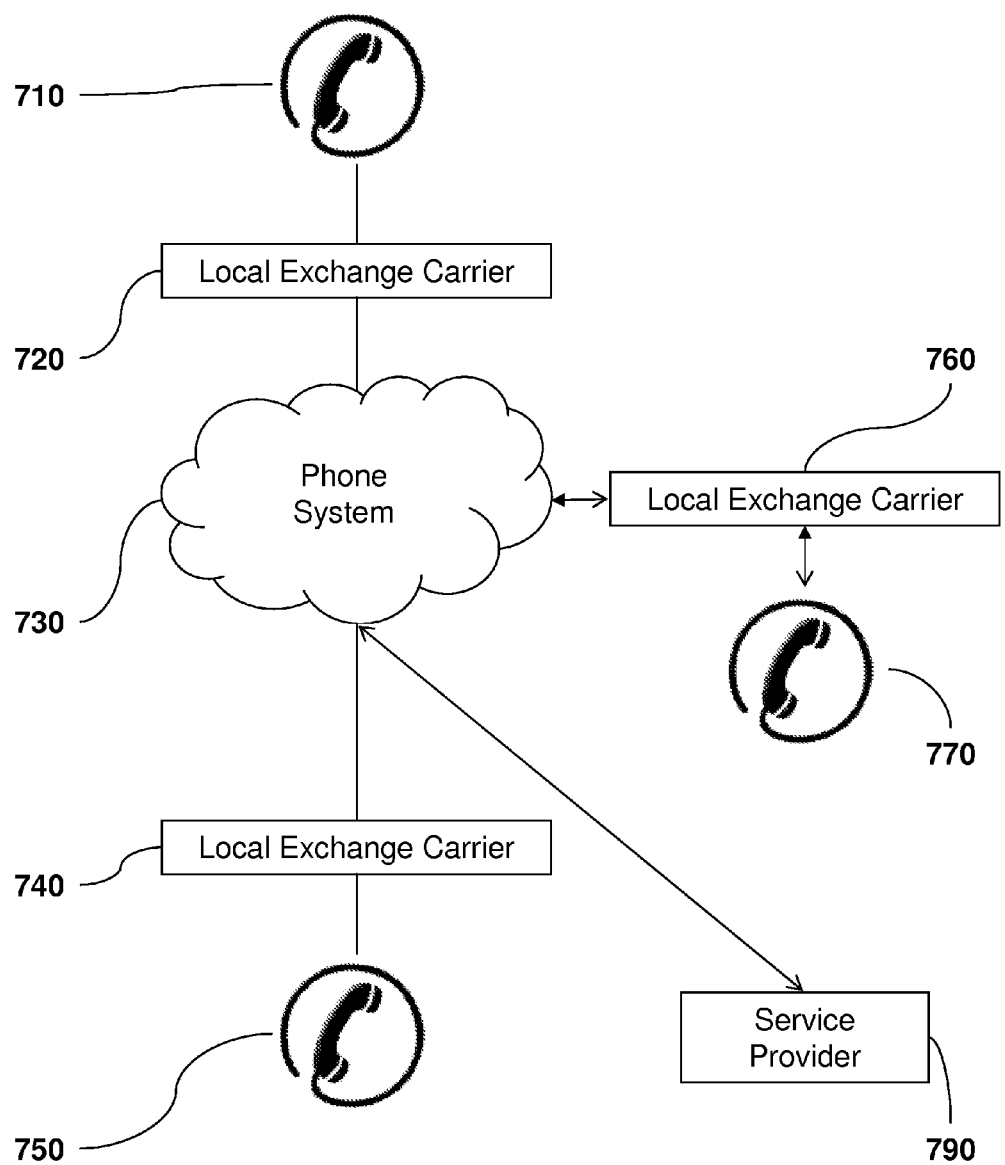
FIG. 7 shows a high level block diagram of a device on which embodiments of the invention which comprise a service provider and carrier may be carried out.

FIG. 7 shows a high level block diagram of a device on which embodiments of the invention which comprise a service provider and carrier may be carried out. Elements shown on FIG. 4 have been incremented by 300 in FIG. 7. Calling party 710 is connected to a local exchange carrier 720. The local exchange carriers 720, 740, and 760 may be any phone service provider such as a traditional CLEC, a Voice over IP (Internet Protocol) phone service provider, or other phone provider. Local exchange carrier 740 provides phone service to a called party 750.

The called party lacks the ability to receive ANI information or other data associated with the call such as if the called party 450 is not an inward WATS subscriber. However, the carrier 770 (i.e. an intermediary between the called party and the service provider which may be a separate entity from the local exchange carrier) has the ability to receive ANI information or the other data associate with the call, as the carrier 770 has access to such data. The carrier 770 receives phone service is associated with a local exchange carrier 760 or other connection to the phone system cloud 730. It should be further noted that the carrier 770 may be separate from the carrier providing phone service to either the calling party 710 or called party 750. The collective phone system 730 comprises the switches, connections, control equipment, and devices of the phone system over which parties, such as the calling party 710, called party 750, and/or carrier 770, may communicate or connect to each other via voice communications.

Referring again to FIG. 7, in embodiments of the invention, the calling party 710 places a call via the local exchange carrier 720 to the called party 750 via the called party's local exchange carrier 740 and the phone system 730. At any point during the attempt to initiate communications between the calling party 710 and the called party 750, the call may be redirected or forwarded to the carrier 770 via local exchange carrier 760. This may be accomplished, by a service provider such as the local exchange carrier 740 or by the called party 750, automatically, or upon meeting certain conditions such as failing to answer the call. Other conditions may be met may include incorrect, incomplete, blank, suspicious, or private caller ID information.

The call, in such instances described above, is then forwarded to the carrier 770. The carrier 770 has legal access to the ANI information, despite Caller ID information being blocked, incomplete, not provided, or the like as ANI is a separate and typically unblockable service. While embodiments of the invention have been described with reference to ANI, any information associated with the call which is accessible to the carrier 770 and not to the called party 750 may be used in place of ANI.

Then, in embodiments of the invention, the carrier 770 forwards the call with the ANI (or other) data to a service provider 790 by way of a direct connection (not shown) or through the phone system 730 (shown). The service provider 790 is a separate legal and/or physical entity from the carrier 770. The service provider 790 may provide services such as forwarding, recording, voicemail, CallerID "spoofing," and the like. In embodiments of the invention, the service provider 790 receives a forwarded call from the carrier 770 complete with ANI data or other data which was hidden to the called party 750 in a format which is readable to the service provider 790. The service provider 790 may then populate the caller ID data or other data associated with the call, such as forwarding number data (or RDNIS), and forward the call back through the phone system to the local exchange carrier 740 and the called party 750. In this manner, the caller party 750 has access to information associated with the call which was unavailable to the called party at the first iteration of receiving the call.

Figure 8:
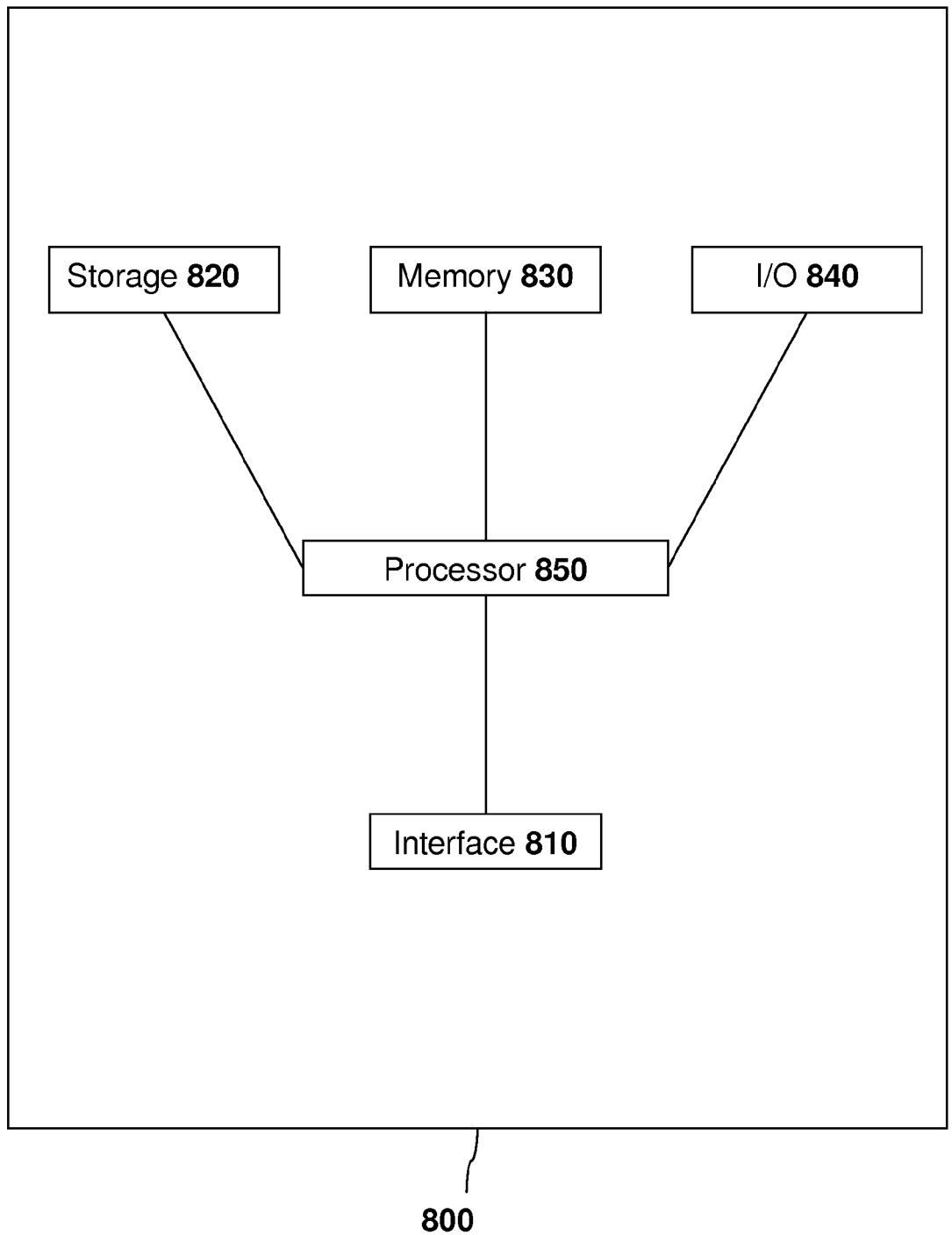
FIG. 8 shows a high-level block diagram of a computer that may be used to carry out the invention.

FIG. 8 shows a high-level block diagram of a computer that may be used to carry out the invention. Computer 800 contains a processor 850 that controls the overall operation of the computer by executing computer program instructions which define such operation. The computer program instructions may be stored in a storage device 820 (e.g., magnetic disk, database) and loaded into memory 830 when execution of the computer program instructions is desired. Thus, the computer operation will be defined by computer program instructions stored in memory 830 and/or storage 820, and the computer will be controlled by processor 850 executing the computer program instructions. Computer 800 also includes one or a plurality of input network interfaces for communicating with other devices via a network (e.g., the Internet). Computer 800 also includes one or more output network interfaces 810 for communicating with other devices. Computer 800 also includes input/output 840 representing devices which allow for user interaction with the computer 800 (e.g., display, keyboard, mouse, speakers, buttons, etc.). One skilled in the art will recognize that an implementation of an actual computer will contain other components as well, and that FIG. 8 is a high level representation of some of the components of such a computer for illustrative purposes. It should also be understood by one skilled in the art that the method and devices depicted in FIGS. 1 through 7 may be implemented on a device such as is shown in FIG. 8.

While the invention has been taught with specific reference to the above embodiments, a person having ordinary skill in the art will recognize that changes can be made in form and detail without departing from the spirit and the scope of the invention. The described embodiments are to be considered in all respects only as illustrative and not restrictive. All changes that come within the meaning and range of equivalency of the claims are to be embraced within their scope. Combinations of any of the methods, systems, and devices described hereinabove are also contemplated and within the scope of the invention.

We claim:

1. A method of determining information associated with a calling party comprising, in order, the steps of:

receiving a phone call from said calling party to a non-Inward WATS phone number associated with a called party;

in a first forwarding, forwarding said phone call to an Inward WATS phone number associated with a third party service provider;
notifying said called party of a phone number of said calling party by forwarding said phone call with a second distinct forwarding of said phone call to said called party.

2. The method of claim 1, further comprising a step of forwarding said phone call to said called party.

3. The method of claim 1, wherein said forwarding is based on unsatisfactory calling number identification information.

4. The method of claim 1, wherein said phone call is at least partially recorded.

5. The method of claim 4, wherein said forwarding is to voicemail of said called party.

6. The method of claim 5, wherein said voicemail is exhibited to said called party in real-time.

7. The method of claim 1, wherein said notifying said called party of a phone number of said calling party comprises notifying said called party of the Automatic Number Identification (ANI) associated with said calling party.

8. The method of claim 1, wherein said notifying is selected from the group consisting of notifying via Caller ID, text message, SMS, short SMS, and e-mail.

9. A system configured to provide a called party with caller identification information comprising:
receiving a call forwarded from a called number by a called party to a telephone carrier wherein said call comprises ANI data unavailable to said called number;
exhibiting at least a part of said ANI information to said called party;
at said telephone carrier receiving said forwarded call, determining said called number; and
further at said telephone carrier, conducting a second forwarding of said call to said called number such that said called number receives said call from a calling party making a single phone call, twice.

10. The system of claim 9, wherein after said step of receiving, said call is forwarded to an intermediary service provider.

11. The system of claim 10, wherein said intermediary service provider carries out said steps of exhibiting and forwarding.

12. The system of claim 10, wherein said service provider further records at least a part of said call.

13. The system of claim 10, wherein said exhibiting comprises exhibiting caller ID information.

14. The system of claim 9, wherein said step of receiving is repeated followed by a step of forwarding said call to voicemail.

15. A device for providing a called party with a phone number of a calling party comprising:
receiving means for receiving a call forwarded from said called party to said device;
extracting means for reading ANI information associated with said calling party;
detecting means for detecting if said forwarded call is in a first or second iteration of forwarding; and
sending means configured to send at least part of said ANI information and said phone call to said called party if said forwarding is in a first iteration and to voicemail if forwarding is in said second iteration.

16. The device of claim 15, wherein said device comprises a device of a carrier and a device of a service provider.

17. The device of claim 15, wherein said device further comprises means for recording said phone call.

18. A computer readable storage medium comprising instructions executable on a computing device for carrying out the functions of:
receiving a call forwarded a first distinct time from a called number by a called party, said call originating from a calling party wherein said call comprises ANI data unavailable to said called number;
reading ANI information associated with said calling party; and
sending at least a part of said ANI information to said called party while forwarding said call back to said called number of said called party in a second distinct forwarding.

19. The computer readable storage medium of claim 18, wherein said ANI information is forwarded to said called party in the form of a text message.

20. The computer readable storage medium of claim 18, wherein said ANI information is forwarded to said called party in the form of Caller ID information.

21. The computer readable storage medium of claim 18, wherein said sending further comprises sending voice data received from said calling party to said called party.

* * * * *